United States Patent [19]

Ito et al.

[11] Patent Number: 6,007,958
[45] Date of Patent: Dec. 28, 1999

[54] POLYESTER RESIN FOR FULL COLOR TONER

[75] Inventors: Hirokazu Ito; Hitoshi Iwasaki; Noriyuki Tajiri, all of Toyohashi, Japan

[73] Assignee: Mitsubishi Rayon Company Ltd., Tokyo, Japan

[21] Appl. No.: 08/973,746

[22] PCT Filed: Jun. 25, 1996

[86] PCT No.: PCT/JP96/01754

§ 371 Date: Dec. 22, 1997

§ 102(e) Date: Dec. 22, 1997

[87] PCT Pub. No.: WO97/01797

PCT Pub. Date: Jan. 16, 1997

[30] Foreign Application Priority Data

Jun. 27, 1995 [JP] Japan ..................... 7-161100

[51] Int. Cl.[6] .................................. G03G 9/087
[52] U.S. Cl. ............................ 430/109; 528/272
[58] Field of Search ............................ 430/106, 109, 430/96; 528/272

[56] References Cited

U.S. PATENT DOCUMENTS

| | | | |
|---|---|---|---|
| 4,980,448 | 12/1990 | Tajiri et al. | 528/194 |
| 5,057,596 | 10/1991 | Kubo et al. | 528/272 |
| 5,153,301 | 10/1992 | Tajiri et al. | 430/99 |
| 5,270,436 | 12/1993 | Kubo et al. | 128/176 |
| 5,276,127 | 1/1994 | Takyu et al. | 528/194 |
| 5,409,989 | 4/1995 | Ito et al. | 430/120 |
| 5,807,654 | 9/1998 | Kubo et al. | 430/109 |

FOREIGN PATENT DOCUMENTS

| | | |
|---|---|---|
| 0 291 059 | 11/1988 | European Pat. Off. . |
| 0 312 691 | 4/1989 | European Pat. Off. . |
| 0 320 819 | 6/1989 | European Pat. Off. . |
| 0 464 829 | 1/1992 | European Pat. Off. . |
| 0 471 302 | 2/1992 | European Pat. Off. . |

OTHER PUBLICATIONS

Derwent Abstract, AN 94–189039, JP 06 128 367, May 10, 1994.

*Primary Examiner*—John Goodrow
*Attorney, Agent, or Firm*—Oblon, Spivak, McClelland, Maier & Neustadt, P.C.

[57] ABSTRACT

A polyester resin for a full color toner which comprises a) from 0.5 to 5% by mole, based on all the acid components, of a tribasic or higher carboxylic acid component and/or a trihydric or higher alcohol component, b) at least 95% by mole, based on all the acid components, of a dibasic carboxylic acid component, c) from 10 to 80% by mole, based on all the acid components, of an aromatic diol component consisting of or containing a bisphenol A derivative having ethylene oxide added thereto, and d) from 20 to 110% by mole, based on all the acid components, of an aliphatic diol component; and has a softening temperature of 95 to 115° C., a glass transition temperature of 50 to 70° C., an acid value of 6 to 20 mgKOH/g, a melt viscosity at 118° C. of 1000 to 52,000 poises, a ratio of weight average molecular weight (Mw) to number average molecular weight (Mn) of 1.5 to 5 in the molecular weight distribution determined by gel permeation chromatography, a peak TOP molecular weight of 20,000 or less and a gel fraction of 0.5% by weight or less.

5 Claims, No Drawings

POLYESTER RESIN FOR FULL COLOR TONER

POLYESTER RESIN FOR FULL COLOR TONER

1. Technical Field

The present invention relates to a polyester resin for a full color toner used for electrophotography, electrostatic printing and the like.

2. Background Art

Methods for obtaining images through an electrostatic charge generally involve development of an electrostatic image formed on a photosensitive drum using toner which has previously been electrostatically charged by friction, and then fixing the image. The fixing is accomplished by anchoring the toner image, obtained by development, using a heated fixing roller under pressure. To obtain color images, the colors must be produced and fixed by adhering toner of about 4 different colors onto transfer paper during the developing process described above, and then melting and combining each of the different color toners with silicone oil-coated rollers during a fixing process. In such development processes it is desirable for the toner to have blocking resistance to prevent its solidification during storage, and to have image stability to allow stable images in the development step, as well as a fixing property for the fixing step and, naturally, a coloring property.

Conventionally, it has been strongly desirable for full color toner resins to exhibit a performance suitable for obtaining color images with toners of different colors, including colorability of the fixed images and a sharp melt property for more efficient colorability and fixability onto paper or OHP. Recently, with the demands for high-speed machines and extended running periods, an improvement in resin strength has been a desired goal to prevent reduction in image density due to filming of the toner. Polyester resins have been widely used in the past as a means of countering these problems, through the mechanism of lowering both the molecular weight and the softening temperature of the resin for the sharp melt property and fixing property. Such resins, however, have low strength and poor filming properties when used for a toner, causing problems which include a lack of charge stability and poor image stability. Attempts have therefore been made to vary the monomer compositions of the resins or to employ crosslinking agents, and such efforts have succeeded in solving those problems to a certain degree. However, in systems employing crosslinking agents, differences in the melt viscosities and molecular weight distributions of resins have led to adverse effects on the fixing property in cases where the fixing speed is higher or the fixing strength is adapted to lower temperatures.

For these reasons, there has been a strong demand for resins with a sharp melt property, a fixing property and a coloring property which have traditionally been required, as well as improved filming resistance without loss of blocking resistance.

DISCLOSURE OF THE INVENTION

It is an object of the present invention to provide a polyester resin for a full color toner to be used for electrophotocraphy, electrostatic printing and the like, which has an excellent fixing property and coloring property as well as improved filming resistance without loss of blocking resistance.

As a result of diligent research regarding the balance between the molecular weights, softening temperatures and melt viscosities of polyester resins employing trace amounts of crosslinking agents, the present inventors have completed the present invention upon the discovery of a polyester resin for a full color toner which not only has a sharp melt property, a fixing property and a coloring property but also has excellent filming resistance, while maintaining the excellent blocking resistance inherent in polyester resins.

Thus, the present invention provides a polyester resin for a full color toner which comprises a) from 0.5 to 5% by mole, based on all the acid components, of a tribasic or higher carboxylic acid component and/or a trihydric or higher alcohol component, b) at least 95% by mole, based on all the acid components, of a dibasic carboxylic acid component, c) from 10 to 80% by mole, based on all the acid components, of an aromatic diol component consisting of or containing a bisphenol A derivative having ethylene oxide added thereto, and d) from 20 to 110% by mole, based on all the acid components, of an aliphatic diol component; and has a softening temperature of 95 to 115° C., a glass transition temperature of 50 to 70° C., an acid value of 6 to 20 mgKOH/g, a melt viscosity at 118° C. of 1000 to 52,000 poises, a ratio of weight average molecular weight (Mw) to number average molecular weight (Mn) of 1.5 to 5 in the molecular weight distribution determined by gel permeation chromatography, a peak TOP molecular weight of 20,000 or less and a gel fraction of 0.5% by weight or less.

BEST MODE FOR CARRYING OUT THE INVENTION

As the -tribasic or higher polybasic carboxylic acid component and/or a trihydric or higher polyhydric alcohol component a) to be effectively used for the invention there may be mentioned, for example, tribasic or higher polybasic carboxylic acids such as trimellitic acid, pyromellitic acid, 1,2,4-cyclohexanetricarboxylic acid, 2,5,7-naphthalenetricarboxylid acid, 1,2,4-naphthalenetricarboxylic acid, 1,2,5-hexanetricarboxylic acid, 1,2,7,8-octanetetracarboxylic acid and their acid anhydrides. There may also be mentioned trihydric or higher polyhydric alcohols such as sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4--butanetriol, trimethylolpropane and 1,3,5-trihydroxymethylbenzene. Particularly preferred are trimellitic acid and its anhydride, and pentaerythritol or trimethylolpropane, and these tribasic or higher polybasic carboxylic acids and trihydric or higher polyhydric alcohols may be used either alone or in combinations of 2 or more.

The amount of the aforementioned component a) to be used may be 0.5 to 5% by mole, and more preferably 1 to 4% by mole, with respect to all the acid components. Toners employing resins with component a) in this range can provide strength to the resins and give satisfactory filming resistance, blocking resistance and durability. Sufficient strength cannot be obtained with resins in which the amount of component a) is less than 0.5% by mole, and Loners employing them tend to have inferior filming resistance, blocking resistance and durability during printing, while toners employing resins in which the amount exceeds 5% by mole, though having satisfactory filming resistance, tend to have a poor fixing property.

As the dJibasic carboxylic component b) there may be mentioned, for example, terephthalic acid, isophthalic acid, phthalic acid, sebacic acid, isodecylsuccinic acid, maleic acid, fumaric acid, adipic acid and their monomethyl esters, monoethyl esters, dimethyl esters, diethyl esters and anhydrides. Terephthalic acid, isophthalic acid and adipic acid are particularly preferred, and these may each be used alone or in combinations of 2 or more.

The amount of the dibasic carboxylic component b) to be used is at least 95% by mole, and more preferably at least 96% by mole. Toners employing resins with the dibasic carboxylic component b) at less than 95% by mole have a poor fixing property because of their high viscosity.

According to the invention, an aromatic diol component consisting of or containing a bisphenol A derivative having ethylene oxide added thereto is used as the aromatic diol component c). As bisphenol A derivatives having ethylene oxide added thereto there may be mentioned, for example, polyoxyethylene(2.0)-2,2-bis(4-hydroxyphenyl) propane, polyoxyethylene(2.3)-2,2-bis(4-hydroxyphenyl) propane, polyoxyethylene(2.8)-2,2-bis(4-hydroxyphenyl) propane and polyoxyethylene(3.0)-2,2-bis(4-hydroxyphenyl) propane, which may be used each alone or in combinations of 2 or more. It is particularly preferred to use polyoxyethylene(n)-2,2-bis(4-hydroxyphenyl) propane where $2.0 \leq n \leq 3.0$, in order to increase the glass transition temperature of the resin and give toner with a satisfactory coloring property and excellent filming resistance. These bisphenol A derivatives having ethylene oxide added thereto can provide increased reactivity during polymerization of the resin, and even using the aforementioned tribasic or higher polybasic carboxylic acid component or trihydric or higher polyhydric alcohol, it is possible to achieve suitable properties as a binder resin for full color toner, including softening temperature and molecular weight, while also providing sufficiently increased resin strength by only branching, without crosslinking, the resin, providing excellent filming resistance as a toner, as well as causing no reduction in image density and giving clear full color images. As other aromatic diol components there may be mentioned bisphenol A derivatives having propylene oxide added, such as polyoxypropylene(2.0)-2,2-bis(4-hydroxyphenyl) propane, polyoxypropylene(2.3)-2,2-bis(4-hydroxyphenyl) propane, polyoxypropylene(2.8)-2,2-bis(4-hydroxyphenyl) propane and polyoxypropylene(3.0)-2,2-bis(4-hydroxypheiiyl) propane, which may be used each alone or in combinations of 2 or more. It is particularly preferred to use polyoxypropylene(n)-2,2-bis(4-hydroxyphenyl) propane where $2.1 \leq n \leq 2.5$. When using in combination a bisphenol A derivative with ethylene oxide added and a bisphenol A derivative with propylene oxide added, it is preferred for the proportion of the polyoxyethylene(n)-2,2-bis(4-hydroxyphenyl) propane where $2.0 \leq n \leq 3.0$ to be greater than that of the polyoxypropylene(n)-2,2-bis(4-hydroxyphenyl) propane where $2.1 \leq n \leq 2.5$, for more satisfactory filming resistance of the toner. Such a diol component is preferred from the standpoint of raising the glass transition temperature of the resulting resin, but because of its susceptibility to thermal decomposition at high temperatures, its amount will be limited when used in combination with dibasic carboxylic acid components which require a high reaction temperature.

The amount thereof to be used is 10 to 80% by mole, and preferably 15 to 75% by mole with respect to all the carboxylic acid components. Toners employing resins wherein the amount of the aromatic diol component c) is less than 10% by mole have a problem of lower glass transition temperatures, while at greater than 80% by mole an adverse effect results on the coloring property of the toner.

As the aliphatic diol component d) to be effectively used according to the invention there may be mentioned, for example, ethylene glycol, neopentyl glycol, propylene glycol, butanediol and polyethylene glycol, which may be used alone or in mixtures of 2 or more. These aliphatic diols have tne function of increasing the condensation polymerization reaction rate for production of the polyester. Ethylene glycol, neopentyl glycol and butanediol are preferred among these, from the standpoint of the fixing property.

The amount of these aliphatic diols to be used is 20 to 110% by mole, and preferably 25 to 105% by mole, with respect to all of the carboxylic acid components.

For production of a resin according to the present invention, the aforementioned components a) to d) are loaded into a reaction vessel which is then heated to raise the temperature for an esterification reaction or a transesterification reaction. As necessary, an esterification catalyst or transesterification catalyst commonly used for an esterification reaction or a transesterification reaction is used, such as sulfuric acid, titanium butoxide, dibutyl tin oxide, magnesium acetate or manganese acetate. The water or alcohol generated by the reaction is then removed by a common method. This is followed by the polymerization reaction, whereby polymerization (condensation polymerization) is carried out under a vacuum of 150 mmHg or lower while distilling off the diol components.

A known polymerization catalyst such as titanium butoxide, dibutyl tin oxide, tin acetate, zinc acetate, tin disulfide, antimony trioxide or germanium dioxide may also be used for the polymerization. There are no particular restrictions on the polymerization temperature or amount of catalyst, and these may be set as desired depending upon the need. However, because of frequent problems with the color of resins for full color toner, the reaction temperature for the polymerization step is preferably controlled within the ranges defined by the following expressions (1) and (2):

(temperature for esterification reaction or transesterification reaction)>(temperature for condensation polymerization reaction)    (1)

and $0.66 \leq$(temperature for condensation polymerization reaction)/(temperature for esterification reaction or transesterification reaction)<1    (2)

and more preferably it satisfies expression (1) and the following expression (3):

$0.7 \leq$(temperature for condensation polymerization reaction)/(temperature for esterification reaction or transesterification reaction)<0.95    (3)

Furthermore, it is important for the resin according to the invention to have a softening temperature of 95 to 115° C., a glass transition temperature of 50 to 70° C., an acid value of 6 to 20 mgKOH/g, a melt viscosity at 118° C. of 1000 to 52,000 poises, an Mw/Mn ratio of 1.5 to 5 in the molecular weight distribution determined by gel permeation chromatography, a peak TOP molecular weight of 20,000 or less and a gel fraction of 0.5% by weight or less.

The softening temperature of the resin of the invention is 95 to 115° C., and more preferably 100 to 114° C. Toners employing resins with softening temperatures of lower than 95° C. tend to have inferior blocking resistance, while toners employing resins with softening temperatures of higher than 115° C. tend to have an inferior fixing property.

The glass transition temperature of the resin of the invention is 50 to 70° C., and more preferably 52 to 67° C. Toners employing resins with glass transition temperatures of lower than 50° C. tend to have inferior blocking resistance, while toners employing resins with glass transition temperatures of higher than 70° C. tend to have an inferior fixing property.

The acid value of the resin of the invention is 6 to 20 mgKOH/g, and more preferably 10 to 18 mgKOH/g. With toners employing resins having acid values of under 6 mgKOH/g there are problems of reduced charge capacity and lower image density, while -toners employing resins having acid values exceeding 20 mgKOH/g tend to have inferior moisture resistance.

For satisfactory filming resistance of the toner it is important for the resin of the invention to have a melt viscosity at 118° C. of 1000 to 52,000 poises, preferably 2000 to 40,000 poises, and more preferably 2000 to 25,000 poises. Toners employing resins with melt viscosities of less than 1000 poises tend to have inferior filming resistance, while toners employing resins with melt viscosities of greater than 52,000 poises tend to have an inferior sharp melt property, fixing property and coloring property.

More importantly, the resin of the invention has an Mw/Mn ratio of 1.5 to 5, and especially 2 to 4, in the molecular weight distribution determined by gel permeation chromatography and a peak TOP molecular weight of 20,000 or less, and especially 18,000 or less. Toners employing resins with an Mw/Mn ratio of less than 1.5 tend to have inferior blocking resistance, while toners employing resins with an Mw/Mn ratio of greater than 5 tend to have an inferior coloring property. Also, toners employing resins with a peak TOP molecular weight exceeding 20,000 tend to have an inferior sharp melt property, fixing property and coloring property.

The use of the tribasic or higher polybasic carboxylic acid component or trihydric or higher polyhydric alcohol in a specific amount in the resin of the invention adds strength to the resin, and by moderately crosslinking the resin or creating a slight degree of branching without fully crosslinking it, to make a resin containing substantially no gel portion, it is possible to add strength to the resin without increasing its viscosity, and thus provide satisfactory blocking resistance and durability without impairing the sharp melt, coloring and fixing properties for toners. It is therefore important for the resin of the invention to have a gel fraction of less than 0.5% by weight, preferably less than 0.3% by weight, and more preferably 0% by weight. Toners employing resins with gel fractions exceeding 0.5% by weight have an inferior fixing property despite having satisfactory filming resistance.

The resin of the invention also preferably has a hydroxyl value of 20 to 60 mgKOH/g, and especially 23 to 55 mgKOH/g. Toners employing resins with hydroxyl values exceeding 60 mgKOH/g tend to have impaired filming resistance, while toners employing resins with hydroxyl values less than 20 mgKOH/g tend to have an inferior fixing property.

According to the invention, the softening temperature is the temperature at which 1/2 of a 1.0 g sample flows when measured using a CFT-500 Flow Tester by Shimazu Laboratories, KK., with a 1 mmφ×10 mm nozzle, a 30 Kgf load and a uniform temperature elevating rate of 30° C./min. The melt viscosity is the viscosity at 118° C., measured using the same apparatus mentioned above, with a 0.5 mmφ×15) mm nozzle, a 10 Kgf load and a uniform temperature elevating rate of 6° C./min. The glass transition temperature is the temperature at the tangential crosspoint between the chart baseline and the endothermic curve near the glass transition point, using a differential scanning calorimeter with a temperature elevating rate of 5° C./min.

The Mw/Mn ratio and the peak TOP molecular weight were measured with a Toso GPC HCL-8200 using -zetrahydrofuran as the mobile phase solvent. The acid value and hydroxyl value were measured by titration with a KOH solvent. The gel fraction is the value obtained by placing 0.5 g of resin in 50 ml of tetrahydrofuran, heating to dissolution at 70° C. for 3 hours, filtering with a glass filter covered with Celite #545, vacuum drying and dividing the resulting weight by the initial weight.

The toner of the invention contains the polyester resin described above as its primary binder resin component, and this may be used in combination with a styrene-based polymer, styrene-acrylic based polymer, styrene-butadiene based polymer, epoxy-based polymer or other resin as the binder resin. The toner of the invention also contains the above-mentioned binder resin at 60% by weight or more, and it may be produced by adding thereto as necessary an inorganic pigment, chromatic dye, organic pigment or other coloring agent, a wax such as polyolefin wax, a lubricant such as polytetrafluoroethylene, zinc stearate or polyvinylidene fluoride, a negative or positive charge control agent, a releasing agent, a magnetic material, a flow enhancer or the like, subjecting the resulting mixture to melt kneading using, for example, a hot roller, kneader, extruder or the like, and then crushing and classifying it with a jet mill, air classifier, etc. to achieve the desired average particle size.

Any known coloring agents may be used as coloring agents in the toner of the invention, examples including carbon black, iron black, nigrosine, benzidine yellow, quinacridone, rhodamine B and phthalocyanine blue. The charge control agent used may be a known negative or positive charge control agent, examples of which include organic salts or complexes and other organic metal compounds containing divalent or higher metals such as Al, Ba, Ca, Cd, Co, Cu, Fe, Hg, Mg, Mn, Ni, Pb, Sn, Sr and Zn. As such organic metal compounds there may be mentioned carboxylates, alkoxylates, organic metal complexes and chelate compounds of the aforementioned metals. These charge control agents may be used in a range of about 0.1 to 10 parts by weight to 100 parts by weight of the binder resin.

Examples of the present invention will now be provided with the understanding that the scope of the invention is not limited thereto. The properties of the resins indicated in these examples were evaluated by the following methods.

1) Fixing Property aluated using a full color copying machine with a freely variable temperature, a printing speed of 20 sheets/min, and a fixing section coated with silicone oil. The judgment scale for the fixing property was as follows.

Resin excellent for toner, fixation onto paper at a fixing section temperature of 110° C. or below: ⊚

Resin satisfactory for toner, fixation onto paper at a fixing section temperature of 120° C. or below: ○

Resin usable for toner, fixation onto paper at a fixing section temperature of 130° C. or below: Δ

Resin unusable for toner, fixation onto paper at a fixing section temperature of 140° C. or higher: ×

2) Blocking Resistance

About 5 g of sample was weighed out and poured into a sample tube which was allowed to stand for about 24 hours in a drier kept at 50° C., and the degree of toner solidification was evaluated as an indicator of the blocking resistance. The evaluation scale was as follows.

Resin excellent for toner, dispersed by simply inverting sample tube: ⊚

Resin usable for toner, dispersed by inverting sample tube and tapping it 2 to 3 times: ○

Resin unusable for toner, dispersed by inverting sample tube and tapping at least 4 to 5 times: x 3) Filming Resistance The full color copying machine used for evaluation of the fixing property was used to determine whether or not contamination occurred on the image or photosensitive drum after a 10,000 sheet printing test. Excellent resins give toner which produces no contamination.

Resin excellent for toner, with no contamination of photosensitive drum: ⊙

Resin satisfactory for toner, with slight contamination of photosensitive drum but no effect on image: ○

Resin usable for toner, with contamination of photosensitive drum which could be improved by adjustment of the formulation: Δ

Toner unusable for toner, with considerable contamination of photosensitive drum: x 4) Image Stability The aforementioned printing test was conducted to evaluate the stability of the image density during continuous printing.

Resin excellent for toner, with relatively stable image density: ⊙

Resin satisfactory for toner, with variation in image density which was not problematic: ○

Resin usable for toner, with variation in image density which could be improved by adjustment of the formulation: Δ

Resin unusable for toner, with large variation in image density: x

EXAMPLE 1

Monomers having the loading compositions listed in Table 1-1 were each loaded into a reaction vessel equipped with a distillation column, and after adding 500 ppm of antimony trioxide with respect to the total acid components, the mixture was stirred at 120 rpm while commencing temperature raising and heating until the temperature of the reaction system reached 260° C., and this temperature was maintained. An esterification reaction was initiated, and about 8 hours after water began to distill out of the reaction system, distillation of water ceased and the reaction was terminated. The reaction system was then cooled and kept at 200° C. and decompressed for about 40 minutes until the vacuum in the reaction vessel reached 1.0 mmHg, the diol components were distilled out of the reaction system, and after 2 hours of polycondensation reaction the reaction product was sampled periodically while continuing the condensation reaction until the desired softening temperature was reached, after which upon achieving the desired softening temperature the reaction vessel was restored to normal pressure and the resin was taken out of the reaction vessel. The resulting resin had no color and was transparent. The relationship between the polymerization temperatures for the esterification reaction and the condensation reaction was within the range of expression (1), and the value calculated according to expression (2) was 0.77. Resins A to E obtained in this manner were hydrolyzed with an alkali, and compositional analysis by liquid chromatography showed the resin compositions listed in Table 1-1. The property values for the resins are also listed in Table 1-1.

Resins A to E were used to prepare toners TA to TE which were also evaluated. The results are shown in Table 1-2. Toners TA to TD had an excellent fixing property, while toner TE was somewhat inferior but still practically usable. Toners TA to TE all had excellent blocking resistance. Toners TB to TE had excellent filming resistance, while toner TA was somewhat inferior but still practically usable. Toners TA to TE all had excellent image stability.

TABLE 1-1

| | | A | B | C | D | E |
|---|---|---|---|---|---|---|
| Loading composition | Terephthalic acid (pts by mole) | 65 | 65 | 65 | 65 | 65 |
| | Isophthalic acid (pts by mole) | 34.5 | 34 | 33 | 31 | 30 |
| | Trimellitic anhydride (pts by mole) | 0.5 | 1 | 2 | 4 | 5 |
| | Diol B* (pts by mole) | 40 | 40 | 40 | 40 | 40 |
| | Ethylene glycol (pts by mole) | 70 | 70 | 70 | 70 | 70 |
| Resin composition | Terephthalic acid (pts by mole) | 65.2 | 65.3 | 65.1 | 65.3 | 65.5 |
| | Isophthalic acid (pts by mole) | 34.3 | 33.6 | 32.9 | 30.6 | 29.5 |
| | Trimellitic anhydride (pts by mole) | 0.5 | 1.1 | 2.0 | 4.1 | 5.0 |
| | Diol B* (pts by mole) | 41 | 40 | 40 | 40.8 | 41 |
| | Ethylene glycol (pts by mole) | 59 | 60.5 | 61.2 | 61.3 | 62 |
| Resin properties | Glass transition temperature (° C.) | 59.0 | 58.5 | 57.0 | 56.2 | 56.3 |
| | Softening temperature (° C.) | 110 | 110 | 110 | 110 | 110 |
| | Acid value (mgKOH/g) | 14.0 | 14.5 | 14.9 | 15.5 | 16.5 |
| | Viscosity (poises) | 12000 | 14000 | 18500 | 21000 | 25000 |
| | Molecular weight distribution Mw/Mn | 2.1 | 2.3 | 2.6 | 3.8 | 4.8 |
| | Peak TOP molecular weight | 8900 | 8700 | 8500 | 8300 | 8300 |
| | Gel fraction (%) | 0 | 0 | 0 | 0 | 0 |
| | Hydroxyl value (mgKOH/g) | 34.5 | 32.6 | 32.0 | 34.3 | 29.5 |

*Diol B: Polyoxyethylene(2)-2,2-bis(4-hydroxyphenyl) propane

TABLE 1-2

| Property evaluated | TA | TB | TC | TD | TE |
|---|---|---|---|---|---|
| Fixing property | ⊙ | ⊙ | ⊙ | ⊙ | Δ |
| Blocking resistance | ⊙ | ⊙ | ⊙ | ⊙ | ⊙ |
| Filming resistance | Δ | ⊙ | ⊙ | ⊙ | ⊙ |
| Image stability | ⊙ | ⊙ | ⊙ | ⊙ | ⊙ |

EXAMPLE 2

Monomers having the loading compositions listed in Table 2-1 were used for polymerization under the same conditions as in Example 1, except that the polymerization temperature for the esterification reaction was 265° C. and the condensation reaction temperature was 190° C., to obtain transparent resins F to I with no coloring. The relationship between the polymerization temperatures for the esterification reaction and the condensation reaction was within the range of expression (1), and the value calculated according to expression (2) was 0.72. The compositions and property values for the resulting resins are also given in Table 2-1.

Toners TF to TI were obtained under the same conditions as Example 1 and evaluated also under the same conditions as Example 1. The results are shown in Table 2-2. Toners TF and TG had an excellent fixing property, toner TH was satisfactory, and TI was somewhat inferior but still practically usable. Toners TG to TI had excellent blocking resistance, while toner TF was somewhat inferior but still practically usable. Toners TG to TI had excellent filming resistance, while toner TF was somewhat inferior but still practically usable. Toners TG and TH had excellent image stability, toner TF was satisfactory, and toner TI was somewhat inferior but still practically usable.

TABLE 2-1

| | | F | G | H | I |
|---|---|---|---|---|---|
| Loading composition | Terephthalic acid (pts by mole) | 65 | 65 | 65 | 95 |
| | Isophthalic acid (pts by mole) | 33 | 33 | 33 | 3 |
| | Trimellitic anhydride (pts by mole) | 2 | 2 | 2 | 2 |
| | Diol B* (pts by mole) | 40 | 40 | 40 | 40 |
| | Ethylene glycol (pts by mole) | 70 | 70 | 70 | 70 |
| Resin composition | Terephthalic acid (pts by mole) | 65.2 | 65.1 | 65.0 | 95.4 |
| | Isophthalic acid (pts by mole) | 32.7 | 32.8 | 32.9 | 2.6 |
| | Trimellitic anhydride (pts by mole) | 2.1 | 2.1 | 2.1 | 2.0 |
| | Diol B* (pts by mole) | 40.2 | 40.3 | 39.9 | 40.1 |
| | Ethylene glycol (pts by mole) | 62.5 | 61.9 | 60.1 | 59.9 |
| Resin properties | Glass transition temperature (° C.) | 95 | 100 | 114 | 115 |
| | Softening temperature (° C.) | 50.1 | 52.5 | 67.0 | 70.0 |
| | Acid value (mgKOH/g) | 20.0 | 17.9 | 10.2 | 6.5 |
| | Viscosity (poises) | 1050 | 2100 | 40050 | 52000 |
| | Molecular weight distribution Mw/Mn | 1.5 | 2.0 | 4.0 | 5.0 |
| | Peak TOP molecular weight | 3400 | 4100 | 18000 | 20000 |
| | Gel fraction (%) | 0 | 0 | 0.3 | 0.5 |
| | Hydroxyl value (mgKOH/g) | 46.6 | 41.4 | 37.0 | 43.7 |

*Diol B: Polyoxyethylene(2)-2,2-bis(4-hydroxyphenyl) propane

TABLE 2-2

| Property evaluated | TF | TG | TH | TI |
|---|---|---|---|---|
| Fixing property | ⊚ | ⊚ | ○ | Δ |
| Blocking resistance | ○ | ⊚ | ⊚ | ⊚ |
| Filming resistance | Δ | ⊚ | ⊚ | ⊚ |
| Image stability | ○ | ⊚ | ⊚ | Δ |

EXAMPLE 3

Monomers having the loading compositions listed in Table 3-1 were used for polymerization under the same conditions as in Example 1 except that the condensation reaction temperature was 220° C., to obtain transparent resins J to M with no coloring. The relationship between the polymerization temperatures for the esterification reaction and the condensation reaction was within the range of expression (1), and the value calculated according to expression (2) was 0.85. The compositions and property values for the resulting resins are also given in Table 3-1.

Toners TJ to TM were obtained under the same conditions as Example 1 and evaluated also under the same conditions as Example 1. The results are shown in Table 3-2. Toners TJ and TM all had an excellent fixing property. Toners TL and TM had excellent blocking resistance, while toners TJ and TK were somewhat inferior but still practically usable. Toners TJ and TK had excellent filming resistance, while toners TL and TM were somewhat inferior but still practically usable. Toners TJ to TM all had excellent image stability.

TABLE 3-1

| | | J | K | L | M |
|---|---|---|---|---|---|
| Loading composition | Terephthalic acid (pts by mole) | 88 | 88 | 65 | 65 |
| | Isophthalic acid (pts by mole) | — | — | 33 | 33 |
| | Trimellitic anhydride (pts by mole) | 2 | 2 | 2 | 2 |
| | Diol A* (pts by mole) | — | — | 25 | 30 |
| | Diol B* (pts by mole) | 10 | 15 | 50 | 50 |
| | Ethylene glycol (pts by mole) | 100 | 95 | 45 | 45 |
| Resin composition | Terephthalic acid (pts by mole) | 87.9 | 87.9 | 65.1 | 65.2 |
| | Isophthalic acid (pts by mole) | — | — | 32.9 | 32.8 |
| | Trimellitic anhydride (pts by mole) | 2.1 | 2.1 | 2.0 | 2.0 |
| | Diol A* (pts by mole) | — | — | 25.1 | 30.2 |
| | Diol B* (pts by mole) | 10.3 | 15.1 | 50.0 | 49.8 |
| | Ethylene glycol (pts by mole) | 91.1 | 85.9 | 25.9 | 21.1 |
| Resin properties | Glass transition temperature (° C.) | 50.5 | 52.3 | 62.0 | 63.0 |
| | Softening temperature (° C.) | 111 | 110 | 110 | 110 |

TABLE 3-1-continued

|  | J | K | L | M |
|---|---|---|---|---|
| Acid value (mgKOH/g) | 13.8 | 14.0 | 15.5 | 15.8 |
| Viscosity (poises) | 24100 | 19000 | 21000 | 22000 |
| Molecular weight distribution Mw/Mn | 2.5 | 2.4 | 2.7 | 2.9 |
| Peak TOP molecular weight | 9100 | 8800 | 8900 | 8800 |
| Gel fraction (%) | 0 | 0 | 0 | 0 |
| Hydroxyl value (mgKOH/g) | 23.1 | 27.1 | 37.3 | 39.6 |

*Diol A: Polyoxypropylene(2.3)-2,2-bis(4-hydroxyphenyl) propane
*Diol B: Polyoxyethylene(2)-2,2-bis(4-hydroxyphenyl) propane

TABLE 3-2

| Property evaluated | TJ | TK | TL | TM |
|---|---|---|---|---|
| Fixing property | ⊚ | ⊚ | ⊚ | ⊚ |
| Blocking resistance | ○ | ○ | ⊚ | ⊚ |
| Filming resistance | ⊚ | ⊚ | Δ | Δ |
| Image stability | ⊚ | ⊚ | ⊚ | ⊚ |

EXAMPLE 4

Monomers having the loading compositions listed in Table 4-1 were used for polymerization under the same conditions as in Example 1, except that the esterification reaction temperature was 255° C. and the condensation reaction temperature was 230° C., to obtain transparent resins N to P with no coloring. The relationship between the polymerization temperatures for the esterification reaction and the condensation reaction was within the range of expression (1), and the value calculated according to expression (2) was 0.9. The compositions and property values for the resulting resins are also given in Table 4-1.

Toners TN to TP were obtained under the same conditions as Example 1 and evaluated also under the same conditions as Example 1. The results are shown in Table 4-2. Toners TN to TP all had an excellent fixing property, blocking resistance and image stability. Toner TN had excellent filming resistance, while toners TO and TP were somewhat inferior but still practically usable.

TABLE 4-1

|  |  | N | O | P |
|---|---|---|---|---|
| Loading composition | Terephthalic acid (pts by mole) | 100 | 100 | 98 |
|  | Trimellitic anhydride (pts by mole) | — | — | 2 |
|  | Diol A* (pts by mole) | — | 10 | 20 |
|  | Diol B* (pts by mole) | 40 | 20 | 40 |

TABLE 4-1-continued

|  |  | N | O | P |
|---|---|---|---|---|
|  | Ethylene glycol (pts by mole) | 88 | 125 | 78 |
|  | Pentaerythritol (pts by mole) | 2 | 4 | 2 |
| Resin composition | Terephthalic acid (pts by mole) | 100 | 100 | 98.1 |
|  | Trimellitic anhydride (pts by mole) | — | — | 1.9 |
|  | Diol A* (pts by mole) | — | 10.1 | 20.1 |
|  | Diol B* (pts by mole) | 40.1 | 20.3 | 40.0 |
|  | Ethylene glycol (pts by mole) | 62.9 | 84.6 | 55.7 |
|  | Pentaerythritol (pts by mole) | 2.0 | 4.1 | 2.2 |
| Resin properties | Glass transition temperature (° C.) | 60.1 | 53.0 | 55.0 |
|  | Softening temperature (° C.) | 110 | 110 | 107 |
|  | Acid value (mgKOH/g) | 13.0 | 12.0 | 13.1 |
|  | Viscosity (poises) | 20050 | 21000 | 11500 |
|  | Molecular weight distribution Mw/Mn | 2.5 | 4.1 | 4.0 |
|  | Peak TOP molecular weight | 9100 | 5800 | 4200 |
|  | Gel fraction (%) | 0 | 0.2 | 0.1 |
|  | Hydroxyl value (mgKOH/g) | 29.8 | 41.7 | 54.5 |

*Diol A: Polyoxypropylene(2.3)-2,2-bis(4-hydroxyphenyl) propane
*Diol B: Polyoxyethylene(2)-2,2-bis(4-hydroxyphenyl) propane

TABLE 4-2

| Property evaluated | TN | TO | TP |
|---|---|---|---|
| Fixing property | ⊚ | ⊚ | ⊚ |
| Blocking resistance | ⊚ | ⊚ | ⊚ |
| Filming resistance | ⊚ | Δ | Δ |
| Image stability | ⊚ | ⊚ | ⊚ |

COMPARATIVE EXAMPLE 1

Monomers having the loading compositions listed in Table 5-1 were used for polymerization under the same conditions as in Example 1 to obtain transparent resins CA to CE with no coloring. The relationship between the polymerization temperatures for the esterification reaction and the condensation reaction was within the range of expression (1), and the value calculated according to expression (2) was 0.77. Also, monomers having the loading compositions listed in Table 5-1 were used for polymerization under the same conditions as in Example 1, except that the esterification reaction temperature was 255° C. and the condensation reaction temperature was 265° C., to obtain resin CF. Resin CF had coloration and poor transparency.

The relationship between the polymerization temperatures for the esterification reaction and the condensation reaction was not within the range of expression (1), and the value calculated according to expression (2) was 1.05. The compositions and property values for the resulting resins are also given in Table 5-1.

Toners TCA to TCF were obtained under the same conditions as Example 1 and evaluated also under the same conditions as Example 1. The results are shown in Table 5-2. Toner TCA had an excellent fixing property, but because of a low glass transition temperature and softening temperature of the resin it had poor blocking resistance, because of a low melt viscosity and high hydroxyl value of the resin it had poor filming resistance, and because of a high acid value of the resin it had poor moisture resistance and inferior image stability, rendering the toner unusable. Also, toner TCB had excellent blocking resistance, filming resistance and image stability, but because the resin had a high glass transition temperature, softening temperature, melt viscosity, Mw/Mn and peak TOP molecular weight, the toner had an inferior fixing property and was therefore unusable. Toner TCC had excellent blocking resistance and image stability and satisfactory filming resistance, but because of a low hydroxyl value and a high Mw/Mn and gel fraction due to many crosslinking components in the resin, the fixing property was inferior, making the toner unusable. Toner TCD had an excellent fixing property, blocking resistance and image stability, but a lack of crosslinking components in the resin resulted in poor filming resistance, making the toner unusable. Toner TCE had an excellent fixing property and filming resistance, but a low glass transition temperature of the resin resulted in poor blocking resistance, and because of a low acid value of the resin, a sufficient charge amount could not be achieved and the imaging was poor, making the toner unusable. Toner TCF had an excellent fixing property, blocking resistance and filming resistance, but because of a low acid value of the resin, a sufficient charge amount could not be achieved, resulting in poor imaging and making the toner unusable, while coloring of the resin resulted in an impaired coloring property, making it unusable for full color toner.

TABLE 5-1

| | | CA | CB | CC | CD | CE | CF |
|---|---|---|---|---|---|---|---|
| Loading composition | Terephthalic acid (pts by mole) | 65 | 95 | 92 | 60 | 100 | 60 |
| | Isophthalic acid (pts by mole) | 33 | 3 | — | 40 | — | 37 |
| | Trimellitic anhydride (pts by mole) | 2 | 2 | 8 | — | — | 3 |
| | Diol B* (pts by mole) | 40 | 40 | 40 | 40 | 5 | 90 |
| | Ethylene glycol (pts by mole) | 70 | 70 | 70 | 70 | 150 | 30 |
| | Pentaerythritol (pts by mole) | — | — | — | — | 5 | — |
| Resin composition | Terephthalic acid (pts by mole) | 65.1 | 95.2 | 92.1 | 60.1 | 100 | 60.1 |
| | Isophthalic acid (pts by mole) | 32.8 | 2.8 | — | 39.9 | — | 37.0 |
| | Trimellitic anhydride (pts by mole) | 2.1 | 2.0 | 7.9 | — | — | 2.9 |
| | Diol B* (pts by mole) | 40.1 | 40.3 | 40.4 | 40.2 | 5.1 | 90.1 |
| | Ethylene glycol (pts by mole) | 64.1 | 59.7 | 59.6 | 60.3 | 115 | 11.3 |
| | Pentaerythritol (pts by mole) | — | — | — | — | 4.9 | — |
| Resin properties | Glass transition temperature (° C.) | 45.0 | 75.0 | 56.0 | 57.0 | 45.0 | 65.0 |
| | Softening temperature (° C.) | 85 | 120 | 112 | 110 | 100 | 110 |
| | Acid value (mgKOH/g) | 23.0 | 11.0 | 13.0 | 14.0 | 4.5 | 4.0 |
| | Viscosity (poises) | 500 | 65000 | 29000 | 8600 | 22500 | 19700 |
| | Molecular weight distribution Mw/Mn | 1.1 | 6.0 | 10.0 | 2.0 | 4.5 | 2.4 |
| | Peak TOP molecular weight | 1850 | 25000 | 5100 | 8900 | 9100 | 9200 |
| | Gel fraction (%) | 0 | 0.8 | 1.5 | 0 | 0.5 | 0 |
| | Hydroxyl value (mgKOH/g) | 111.9 | 32.0 | 16.7 | 36.7 | 24.0 | 22.4 |

*Diol B: Polyoxyethylene(2)-2,2-bis(4-hydroxyphenyl) propane

TABLE 5-2

| Property evaluated | TCA | TCB | TCC | TCD | TCE | TCF |
|---|---|---|---|---|---|---|
| Fixing property | ⊙ | x | x | ⊙ | ⊙ | ⊙ |
| Blocking resistance | x | ⊙ | ⊙ | ⊙ | x | ⊙ |
| Filming resistance | x | ⊙ | ○ | x | ⊙ | ⊙ |
| Image stability | x | ⊙ | ⊙ | ⊙ | x | x |

COMPARATIVE EXAMPLE 2

A monomers having the loading composition listed in Table 6-1 was used for polymerization under the same conditions as in Example 1, to obtain transparent resin CG with no coloring. The relationship between the polymerization temperatures for the esterification reaction and the condensation reaction was within the range of expression (1), and the value calculated according to expression (2) was 0.77. The compositions and property values for the resulting resins are also given in Table 6-1.

Resin C,3 was made into toner and evaluated under the same conditions as Example 1. The results of the toner evaluation are shown in Table 6-2. Toner CG had an excellent fixing property, blocking resistance and image stability, but because polyoxypropylene(2.3)-2,2-bis(4-hydroxyphenyl) propane alone was used as the aromatic diol component, the filming resistance was poor, making the toner unusable.

TABLE 6-1

|  |  | CG |
|---|---|---|
| Loading composition | Terephthalic acid (pts by mole) | 97 |
|  | Trimellitic anhydride (pts by mole) | 3 |
|  | Diol A* (pts by mole) | 40 |
|  | Ethylene glycol (pts by mole) | 65 |
| Resin composition | Terephthalic acid (pts by mole) | 96.9 |
|  | Trimellitic anhydride (pts by mole) | 3.1 |
|  | Diol A* (pts by mole) | 40.1 |
|  | Ethylene glycol (pts by mole) | 61.0 |
| Resin properties | Glass transition temperature (° C.) | 63.0 |
|  | Softening temperature (° C.) | 113 |
|  | Acid value (mgKOH/g) | 16.0 |
|  | Viscosity (poises) | 31000 |
|  | Molecular weight distribution Mw/Mn | 2.1 |
|  | Peak TOP molecular weight | 6800 |
|  | Gel fraction (%) | 0.1 |
|  | Hydroxyl value (mgKOH/g) | 27.0 |

*Diol A: polyoxypropylene(2.3)-2,2-bis(4-hydroxyphenyl) propane

TABLE 6-2

| Property evaluated | TCF |
|---|---|
| Fixing property | ⊚ |
| Blocking resistance | ⊚ |
| Filming resistance | x |
| Image stability | ⊚ |

Industrial Applicability

As explained above, it is possible to obtain full color toners with an excellent fixing property, image stability and blocking resistance, as well as excellent filming resistance, by using polyester resins for toners containing low amounts of crosslinking agents, wherein the Mw/Mn, the peak TOP molecular weight, the melt viscosity, the softening temperature, the glass transition temperature and the acid value are adjusted to within the ranges specified according to the present invention. The invention therefore constitutes a significant contribution to development in the toner and copy machine industry wherein ever greater picture quality and printing speeds are demanded.

We claim:

1. A polyester resin for a full color toner which comprises a) from 0.5 to 5% by mole, based on all the acid components, of a tribasic or higher carboxylic acid component and/or a trihydric or higher alcohol component, b) at least 95% by mole, based on all the acid components, of a dibasic carboxylic acid component, c) from 10 to 80% by mole, based on all the acid components, of an aromatic diol component consisting of or containing a bisphenol A derivative having ethylene oxide added thereto, and d) from 20 to 110% by mole, based on all the acid components, of an aliphatic diol component; and has a softening temperature of 95 to 115° C., a glass transition temperature of 50 to 70° C., an acid value of 6 to 20 mgKOH/g, a melt viscosity at 118° C. of 1000 to 52,000 poises, a ratio of weight average molecular weight (Mw) to number average molecular weight (Mn) of 1.5 to 5 in the molecular weight distribution determined by gel permeation chromatography, a peak TOP molecular weight of 20,000 or less and a gel fraction of 0.5% by weight or less.

2. A polyester resin for a full color toner according to claim 1, wherein the aromatic diol component as component c) contains as essential components a bisphenol A derivative having ethylene oxide added thereto and a bisphenol A derivative having propylene oxide added thereto, with the amount of the bisphenol A derivative having ethylene oxide added thereto being equal to or greater than the amount of the bisphenol A derivative having propylene oxide added thereto.

3. A polyester resin for a full color toner according to claim 1, wherein the aromatic diol component as component c) is a bisphenol A derivative having ethylene oxide added thereto.

4. A polyester resin for a full color toner according to anyone of claims 1, 3, or 4, wherein the hydroxyl value is 20 to 60 mgKOH/g.

5. A full color toner containing a polyester resin according to anyone of claims 1, 3, 4, or 5 as the main component of the binder resin.

* * * * *